United States Patent
Newton et al.

(10) Patent No.: US 8,615,203 B2
(45) Date of Patent: Dec. 24, 2013

(54) ANTENNA SELECTION

(75) Inventors: Timothy John Newton, Suffolk (GB);
Steven Mark Singer, Cambridge (GB);
Peter Wood, Ely (GB)

(73) Assignee: Cambridge Silicon Radio Limited,
Cambridge (GB)

( * ) Notice: Subject to any disclaimer, the term of this patent is extended or adjusted under 35 U.S.C. 154(b) by 555 days.

(21) Appl. No.: 12/784,716

(22) Filed: May 21, 2010

(65) Prior Publication Data

US 2010/0297959 A1    Nov. 25, 2010

(30) Foreign Application Priority Data

May 21, 2009  (GB) .................................. 0908825.3

(51) Int. Cl.
*H04B 1/44*         (2006.01)
(52) U.S. Cl.
USPC .............................. 455/83; 375/136; 370/334
(58) Field of Classification Search
USPC ......................................................... 455/83
See application file for complete search history.

(56) References Cited

U.S. PATENT DOCUMENTS

| | | | |
|---|---|---|---|
| 6,014,571 A | | 1/2000 | Enoki |
| 6,032,033 A * | | 2/2000 | Morris et al. ............. 455/277.2 |
| 6,922,549 B2 | | 7/2005 | Lyons et al. |
| 7,072,409 B2 | | 7/2006 | Suzuki et al. |
| 7,302,244 B2 | | 11/2007 | Spencer et al. |
| 7,546,103 B1 * | | 6/2009 | Kopikare et al. .......... 455/277.1 |
| 2003/0002471 A1 | | 1/2003 | Crawford et al. |
| 2006/0056357 A1 | | 3/2006 | Payne et al. |
| 2009/0010311 A1 * | | 1/2009 | Collier et al. ................. 375/136 |

FOREIGN PATENT DOCUMENTS

| WO | 02/03570 A1 | 1/2002 |
|---|---|---|
| WO | 2006/090133 A1 | 8/2006 |

* cited by examiner

*Primary Examiner* — Fayyaz Alam
*Assistant Examiner* — David Bilodeau
(74) *Attorney, Agent, or Firm* — Fulbright & Jaworski LLP

(57) ABSTRACT

A communication device arranged to operate in accordance with a communication protocol in which a transmitting device is scheduled to commence a transmission at a time known in advance to the receiving device, includes at least two antennas and is arranged to select one of those antennas to receive a transmission from a transmitting device by, immediately before the transmitting device is scheduled to commence its transmission: assessing a quality of a signal received by means of a first one of the antennas; assessing a quality of a signal received by means of a second one of the antennas; and determining, based on the assessed quality of the signals received by means of the first and second antennas, the antenna to be used for receiving the transmission from the transmitting device.

18 Claims, 4 Drawing Sheets

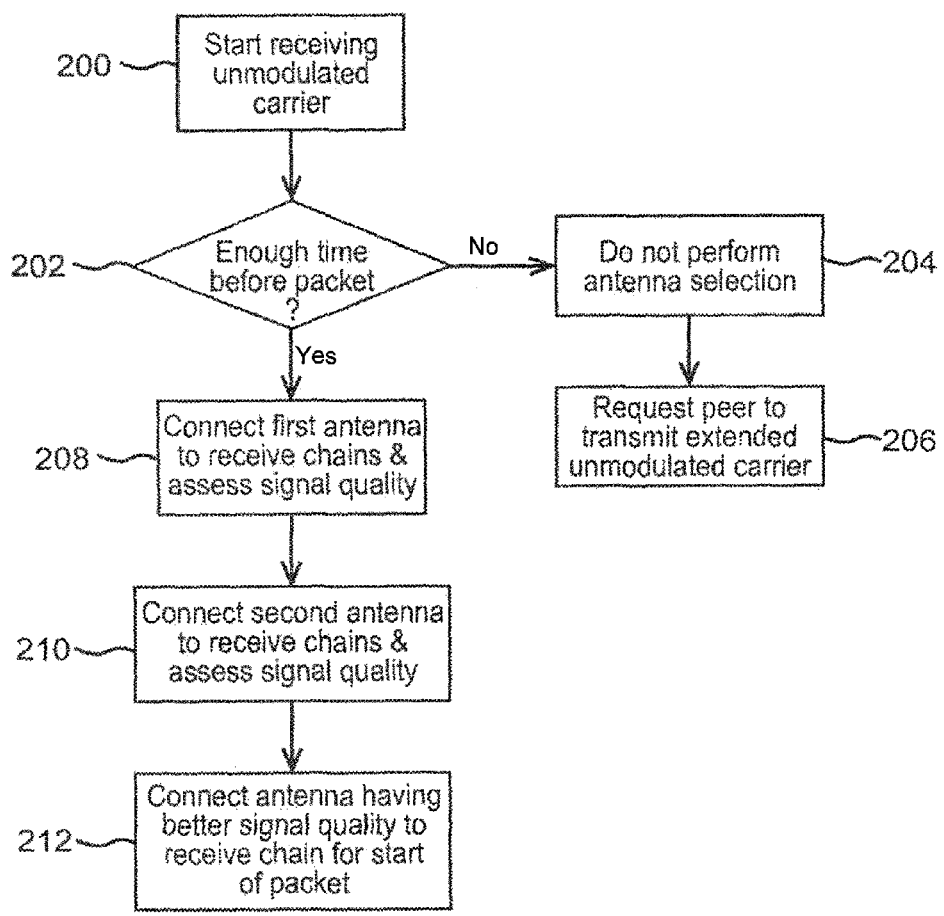

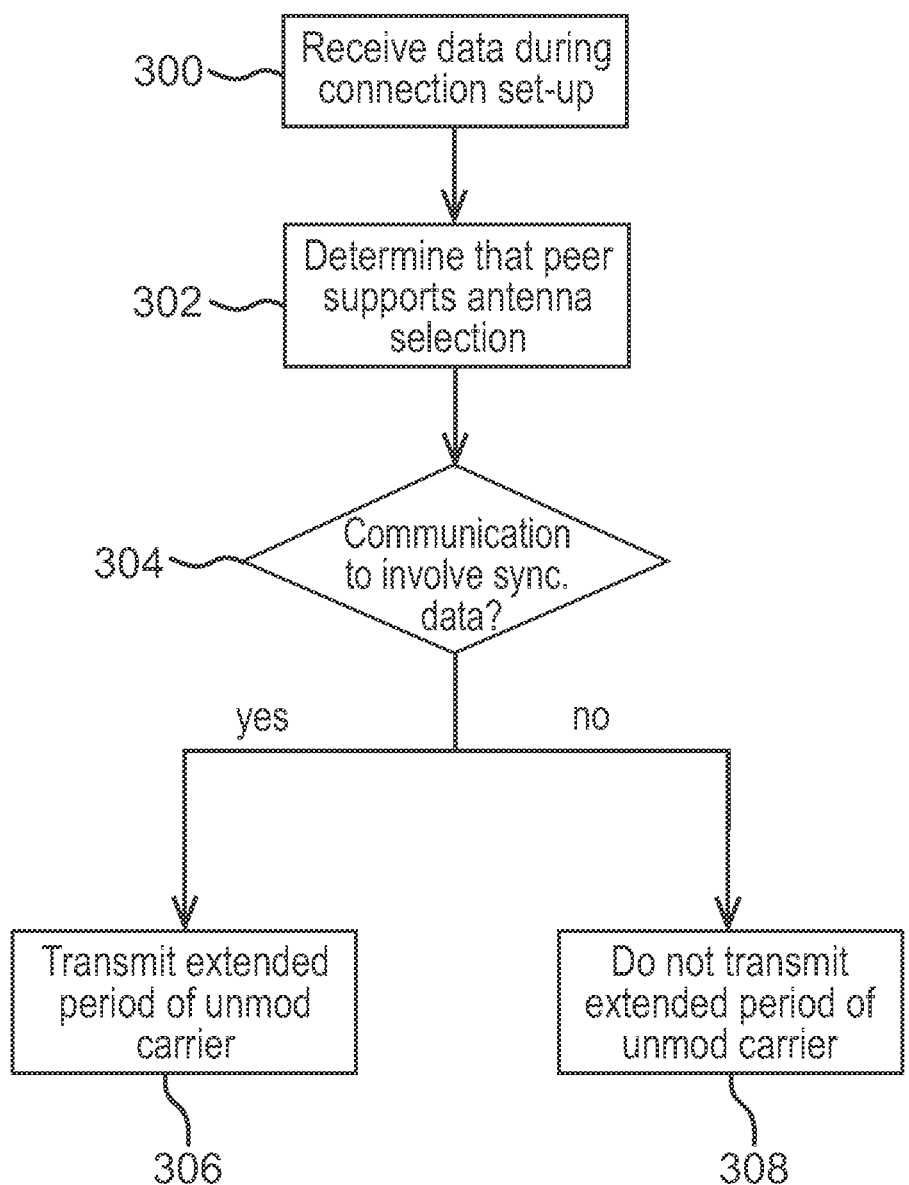

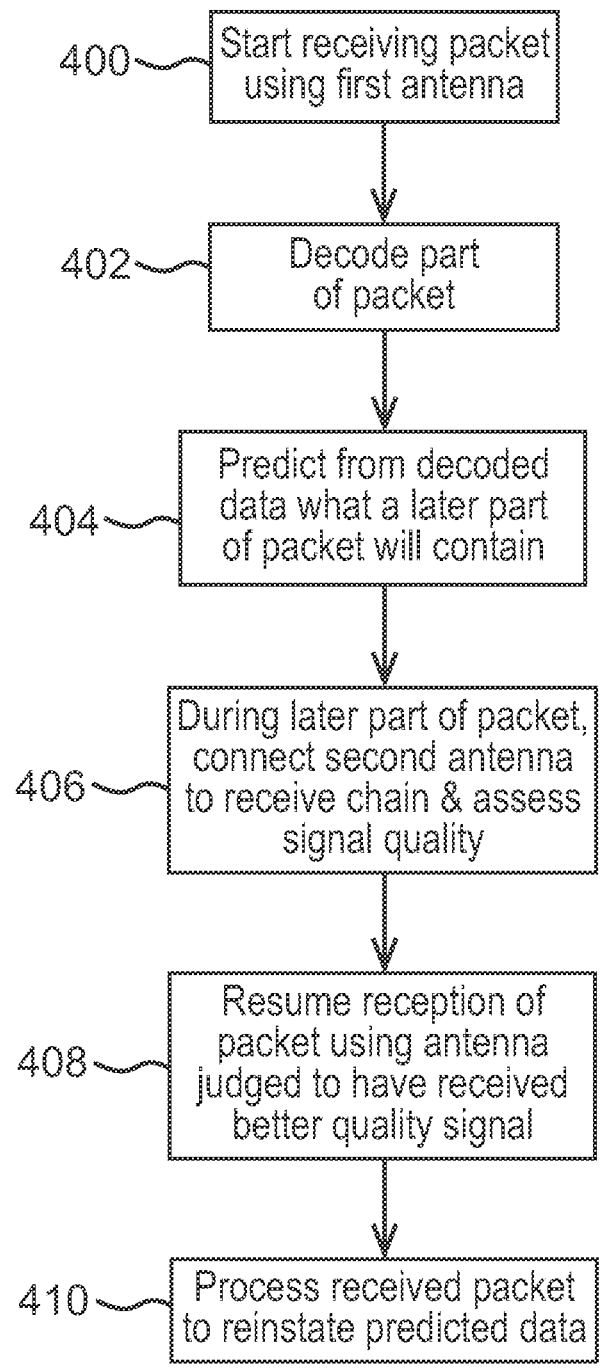

ANTENNA SELECTION

BACKGROUND OF THE INVENTION

The invention relates to a communication device having multiple antennas available to it for receiving a transmission.

Packet-based narrow-bandwidth radio systems, such as Bluetooth, are vulnerable to a variety of interference mechanisms which are collectively and colloquially grouped together as multipath and fading. In these interference mechanisms, the route or routes taken by radio signals from transmitting to receiving antenna cause either no signal to be received, or (due to destructive interference) a badly distorted signal to be received. The nature of these "fades" is such that they tend to be narrowband in nature, and in a frequency-hopping system such as Bluetooth it is likely that the hop onto the next channel will result in a clear fade-free channel.

Fading therefore causes occasional packet loss in a frequency-hopping packet-based system. When asynchronous data is being transferred across such a system—a file transfer, for example—and where mechanisms are available to detect such a loss and to cause a retransmission on another channel, then no significant impact (other than a minor loss of delivered link bandwidth) is incurred. When synchronous data, however, such as sample data representing voice traffic, is being transferred, then retransmission mechanisms are typically either not available or cause the link to use additional power or to have additional latency. Packets lost due to fading may therefore not be recovered and the resultant data loss may result in an audible distortion to the voice traffic.

A variety of proprietary techniques are available to perform Packet Loss Concealment, which involves the use of heuristic algorithms, typically implemented using digital signal processing techniques, in order to reconstruct a plausible version of the lost data. These post-hoc techniques tend to result in increased power usage and add latency.

It is therefore preferable to avoid packet loss.

Antenna diversity, which involves the use of two or more separated antennas, is a known technique for mitigating the effects of multipath/fading in RF systems. In systems operating within the ISM band, such as Bluetooth, the required separation between the antennas to render the technique useful is sufficiently small to make it of interest in applications within small devices, which can typically be either hand-held or worn about the body.

Current state-of-the-art for multi-antenna systems in ISM radios is for such systems to either use two or more receive chains or operate in a post-hoc fashion. In the first case, each antenna is connected to its own receive chain so that the expected packet is received by both of the separated antennas. The results are compared during or after reception and the "best" packet is chosen. In the second case, typically used when a single receive chain is implemented, an antenna is chosen for the upcoming reception based on historical data about the "quality" of reception of packets on the available antennas in the past. This latter case (multiple antennas, a single receive chain and post-hoc processing) brings with it the following unavoidable problems:

(1) Packets generally have to be lost in order to trigger a switch to the "other" antenna.

(2) After any switch has occurred, such a system has no knowledge of the quality of received signal at the "other" antenna without attempting a reception. In a case where the "current" antenna is receiving with marginal quality, making a switch could result in an improvement or in a lost packet, but there is no possibility of finding out which of these outcomes is the more likely without risking a lost packet.

(3) The response latency of such a system is very significant—often so large as to render it useless. A Bluetooth device transmitting SCO voice data and hopping across all 79 of its channels (a typical use-case) will (on average) re-use any given channel only every 290 ms or so. This means that information about fading conditions on a particular channel/antenna combination may well be out of date by the time that the channel is next used. This difference between rapidly-changing fading conditions (such as would be encountered, for example, by a headset-wearing user walking through a steel-framed building) and the response time of any antenna selection algorithm represents a major mismatch between such algorithms and the required response.

These problems mean that a degree of packet loss is unavoidable in a system using post-hoc antenna quality processing. In addition, the response time of such systems may render their application largely fruitless. The undoubted theoretical benefits of antenna diversity have not been realised in practice within mobile Bluetooth devices.

Therefore, there is a need for an improved technique for enabling a device to select between multiple antennas.

SUMMARY OF THE INVENTION

According to a first embodiment of the invention, there is provided a communication device arranged to operate in accordance with a communication protocol in which a transmitting device is scheduled to commence a transmission at a time known in advance to the receiving device, the communication device comprising at least two antennas and being arranged to select one of those antennas to receive a transmission from a transmitting device by, immediately before the transmitting device is scheduled to commence its transmission: assessing a quality of a signal received by means of a first one of the antennas; assessing a quality of a signal received by means of a second one of the antennas; and determining, based on the assessed quality of the signals received by means of the first and second antennas, the antenna to be used for receiving the transmission from the transmitting device.

The communication device may comprise a receive chain switchable between the first and second antennas, the communication device being arranged to: when assessing the quality of the signal received by means of the first antenna, connect the first antenna to the receive chain; when assessing the quality of the signal received by means of the second antenna, connect the second antenna to the receive chain; and when the transmitting device is scheduled to commence its transmission, connect the antenna to be used for receiving that transmission to the receive chain.

The communication device may be arranged to assess the quality of the signals received by means of the first and second antennas by measuring a signal strength of the respective signals received by the first and second antennas.

The communication device may be arranged to assess the quality of the signals received by the first and second antennas by assessing the quality of an unmodulated carrier received from the transmitting device before the transmitting device is scheduled to commence its transmission.

The communication device may be arranged to, if it determines that the transmitting device is not transmitting an unmodulated carrier for sufficient time to enable the communication device to select which of the at least two antennas should be used to receive a transmission from that device, transmit to the transmitting device a request for it to transmit an unmodulated carrier for an extended period of time.

The communication device may be arranged to, if it determines that the transmitting device is not transmitting an unmodulated carrier for sufficient time to enable the communication device to select which of the at least two antennas should be used to receive a transmission from that device, not perform the antenna selection.

The communication device may be arranged to determine that another device is capable of performing an antenna selection operation prior to a time at which a transmitting device is scheduled to commence a transmission in accordance with the protocol, and to, responsive to that determination, commence transmitting to the other device before the communication device was scheduled to commence transmitting in accordance with the protocol.

According to a second embodiment of the invention, there is provided a communication device comprising a receive chain switchable between at least two antennas, the communication device being arranged to: connect a first one of the antennas to the receive chain and start receiving a transmission by means of that antenna; determine that a part of the transmission yet to be received by the communication device will represent data that can be predicted by the device; at the commencement of that part of the transmission, switch the receive chain from being connected to the first one of the antennas to being connected to another one of the antennas; assess a quality of the signal received by the other one of the antennas; and determine, based on the assessed quality of the signal received by the other one of the antennas, which of the at least two antennas to connect to the receive chain for receiving a subsequent part of the transmission.

The communication device may be arranged to assess the quality of the other one of the antennas during a part of the transmission that is representative of a packet header.

The communication device may be arranged to connect the antenna to be used for receiving the subsequent part of the transmission to the receive chain prior to the communication device receiving a part of the transmission that is representative of a packet payload.

The communication device may be arranged to operate in accordance with a protocol that specifies at least part of the data to be included in a transmission, the communication device being arranged to predict, based on the data represented by a part of the transmission already received by the communication device, data that will in accordance with the protocol be represented by a part of the transmission yet to be received by the communication device.

The communication device may be arranged to predict data to be represented by a part of the transmission yet to be received by the device by determining that a part of the transmission yet to be received will represent data already received by the communication device The communication device may be arranged to predict data to be represented by a part of the transmission yet to be received by the device in dependence on a packet type associated with the transmission.

The communication device may be arranged to transmit its response to the transmission by means of the same antenna that is selected to receive the transmission.

According to a third embodiment of the invention, there is provided a communication device arranged to operate in accordance with a communication protocol in which a transmitting device is scheduled to commence a transmission at a time known in advance to the receiving device, the communication device being arranged to determine that another device is capable of performing an antenna selection operation prior to a time at which a transmitting device is scheduled to commence a transmission, and to, responsive to that determination, commence transmitting to the other device before the communication device is scheduled to commence its transmission in accordance with the protocol.

The communication device may be arranged to determine from a transmission received according to the protocol that the other device is capable of performing the antenna selection operation.

The communication device may be arranged to determine that the other device is capable of performing the antenna selection operation in dependence on a section of the transmission that is designated by the protocol for a purpose other that indicating that the transmitting device is capable of performing an antenna selection operation.

The communication device may be arranged to determine that the other device is capable of performing the antenna selection operation in dependence on a section of the transmission that is designated by the protocol to indicate an identifier associated with the transmitting device.

The communication device may be arranged to determine that the other device is capable of performing the antenna selection operation in dependence on a section of the transmission that is designated by the protocol to indicate a manufacturer of the transmitting device.

The communication device may be arranged to determine that the other device is capable of performing the antenna selection operation in dependence on a section of the transmission that is designated by the protocol to indicate a type of the transmitting device.

According to a fourth embodiment of the invention, there is provided a method for selecting an antenna for receiving a transmission made in accordance with a protocol in which a receiving device knows in advance when a transmitting device is scheduled to commence a transmission, the receiving device comprising a receive chain switchable between at least two antennas, the method comprising: the transmitting device transmitting a signal to the receiving device before it is due to commence its transmission in accordance with the protocol; the receiving device connecting a first one of its at least two antennas to the receive chain for receiving said signal and assessing a quality of a signal received by means of the first antenna and then connecting a second one of its at least two antennas to the receive chain and assessing a quality of a signal received by means of the second antenna; and the receiving device, when the transmitting device is scheduled to commence its transmission, connecting one of its at least two antennas to the receive chain in dependence on the assessed quality of the signals received by the first and second antennas.

BRIEF DESCRIPTION OF THE DRAWINGS

For a better understanding of the present invention, reference is made by way of example to the following drawings, in which:

FIG. 2 shows steps of selecting an antenna by means of a period of unmodulated carrier;

FIG. 3 shows steps of determining that an extended period of unmodulated carrier should be transmitted; and FIG. 4 shows steps of selecting an antenna by predicting a future content of a transmission.

DETAILED DESCRIPTION OF THE INVENTION

Figure 1:
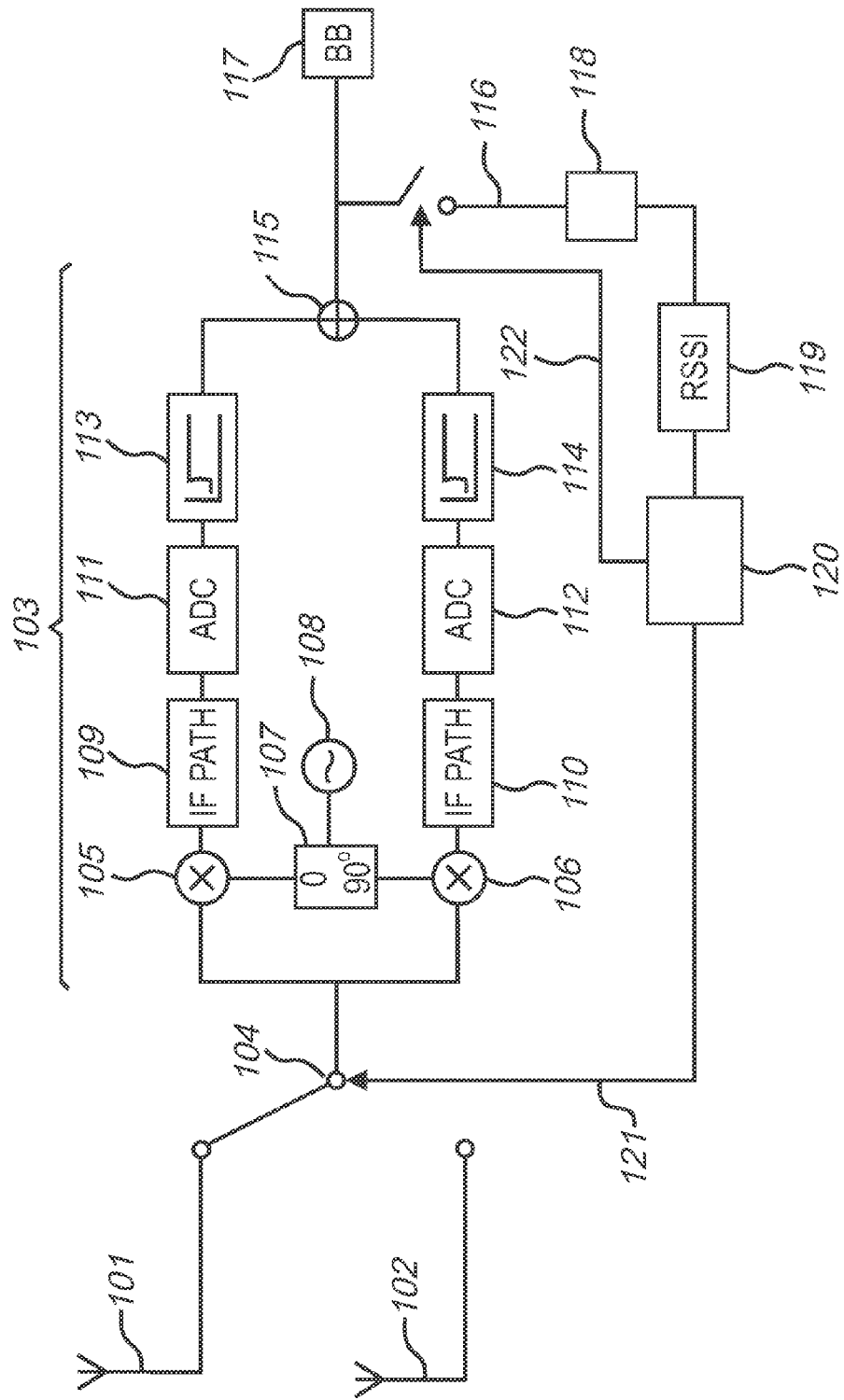
FIG. 1 shows a communication device.

A communication device having two or more antennas may receive a transmission from both of the antennas, assess the quality of the respective signals received by each antenna and select which of the antennas should be used for receiving the remainder of the transmission in dependence on that assessment. A difficulty with this approach can arise when the device only has one receive chain, which is often the case since having the antennas switchably connected to the same receive chain reduces the number of components required. In such a communication device, each antenna may be connected in turn to the receive chain in order to assess the quality of the signal being received by each antenna.

When the receive chain is switched from one antenna to another there is a short time during which the receive chain is not connected to an antenna at all. The communication device is not listening to the transmission during that time instant and so part of the transmission may be lost. However, since this time instant is very brief, a more significant problem may be the sudden change in phase or amplitude of the signal seen by the receive chain as it is switched from one antenna to another: the receive filters in the receive chain take time to settle and start demodulating the incoming signal correctly following sudden changes in phase or amplitude of the incoming signal. The settling time of a filter is typically 1/bandwidth, so a 1 MHz filter will typically take 1 µs. The overall effect, therefore, of switching a single receive chain between different antennas is to create a period of time for which the communication device is not correctly listening to the incoming signal.

The potential data loss caused by not listening to part of a transmission may be minimised by selecting an optimal point in the transmission for assessing the different antennas. For example, if the communication device is capable of operating according to a communication protocol that specifies at least part of what each transmission should contain then the communication device can exploit this advance knowledge to optimise the time at which it performs its antenna selection process. If the device has a single receive chain, the part of the transmission selected for this purpose is preferably long enough to enable at least one of the antennas to be assessed.

A communication device according to an embodiment of the invention is able to utilise the properties of a packet transmitted according to a particular radio standard to determine the best antenna to use for reception before the start of the payload section of a packet, so that the packet is always received using the optimal antenna.

The communication device is equipped with two or more antennas and a means for switching between them. The antenna switch is controlled by the communication device. The time-to-switch is preferably a small number of microseconds. The switched antennas may be connected to a single receive port of the device. The radio standard in use may be of a relatively narrow RF bandwidth (for example 1 MHz) and to have a receive chain which settles in a relatively short time. These are features that are present in many devices capable of operating in a narrow-bandwidth packet-based radio system in the ISM band. It should therefore be understood that the embodiments of the invention described herein are applicable to a wide range of devices capable of operating according to a number of different communication protocols. Embodiments of the invention will now be described with specific reference to the Bluetooth radio standard.

The Bluetooth radio standard is a Time Division Multiplexed (TDM) system. Packets are therefore transmitted by devices at times which are relatively fixed. In any implementable system there has to be allowance for drift and jitter, and in the case of Bluetooth these allowances are 20 ppm drift and +/−1 uS per-packet jitter against that 20 ppm "wall clock" on any given transmission event. In the context of Bluetooth's 625 uS inter-slot timing, these figures are negligible.

Bluetooth packet timing, and to some extent packet structure, are known in advance. Using this knowledge allows the receiving device to rapidly sample the start of the incoming packet using both antennas and to make a judgement about the quality of the likely subsequent packet reception.

An example of a communication device that can use its advance knowledge of Bluetooth packet structure and transmission time to select an optimum time for performing an antenna selection process is shown in FIG. 1. The device comprises two antennas 101, 102 that are each connectable to receive circuitry 103 via switching arrangement 104. The receive circuitry amplifies and demodulates the signals that are received by the connected antenna. The receive circuitry comprises: in-phase and quadrature paths comprising an oscillator, phase-shifter and mixers (105, 106, 107) for producing respective in-phase and quadrature signals; in-phase and quadrature IF circuits 109, 110, which comprise appropriate filtering and amplification stages; analogue-to-digital converters 111, 112; and digital filters 113, 114. In the example shown in FIG. 1, the signals output by the digital filters are combined into a single signal by means of summation unit 115. The output of summation unit 115 is connected to the baseband processing unit 117 and to sampling unit 118 (via switch 116), which is connected to assessment unit 119. The baseband unit 117 performs decoding of the received signal. The assessment unit calculates the Received Signal Strength Indication (RSSI) of the demodulated signal. This is passed to antenna selection unit 120, which controls switching arrangements 104, 116 via signals 121, 122.

Switching the receive circuitry between the two antennas does mean that for a period of time immediately following the switch the signal received by baseband processing unit 117 will not be a sensible signal that can be decoded (as explained above). However, since the baseband processing unit 117 and the antenna selection unit 120 are preferably under the control of the same controller (e.g. the main processor of the communication device), the baseband processing unit 117 can be informed when the antenna selection unit 120 is going to switch the receive circuitry 103 from being connected to one antenna to the other antenna, so that it knows that some of the data it will receive cannot be relied upon.

The antenna selection unit may suitably be a processor operating under software control. The same processor may also be used to implement the assessment unit. Alternatively, the antenna selection unit and/or the assessment unit may be implemented wholly or in part in dedicated hardware.

The circuits shown in FIG. 1 are for the purposes of example only and it should be understood that different arrangements from that shown can be suitably employed for implementing the invention. In particular, the assessment of signal strength might be taken at a different point in the post-reception processing circuitry. However, measuring the RSSI after the digital filters as shown in FIG. 1 may be advantageous because at that stage the received signal is a narrow, baseband signal, which is likely to produce a more accurate estimate of the received signal quality at the frequency of interest than the wider-bandwidth signals available at earlier stages. However, in general, the receive chain to which each antenna is connected for antenna selection purposes need only be long enough to generate a signal from which an acceptable assessment of signal quality in the frequency band of interest can be determined.

The communication device is preferably provided with a fast-responding antenna switch and a fast-responding single receive chain. There are several points during a Bluetooth packet where it is possible to read from one antenna, check received signal quality, switch to another antenna, check again, make a decision about which is better and, if necessary, switch back. These operations may suitably be controlled by the antenna selection unit 120 shown in FIG. 1 by means of switching arrangements 104 and 116.

A result of the antenna selection process is that there will be times when the device cannot rely on the data it has decoded because the receive chain was switched from one antenna to another while that data was being received. Therefore, if the device is to still decode the transmission correctly and in its entirety, the antenna selection unit should switch each antenna into and out of the receive chain at times when the impact on the receive operation can be minimised.

One possibility that has been considered is using the preamble of a Bluetooth packet to perform an antenna selection process. However, a Bluetooth packet header has only a 4 us preamble, which is too short to allow a single receive chain to switch-settle-and-sample on two antennas. In addition, the preamble of a Bluetooth packet can contain information that the receiving device uses to determine whether or not the packet is valid, so that the preamble has to be correctly decoded if invalid packets are to be recognised and discarded. Therefore, a different approach is needed.

Two techniques that enable an antenna selection process to be performed without unacceptably damaging receipt of the packet are described below.

1) It has been realised that many Bluetooth devices transmit an unmodulated carrier at the start of a packet, often in order to allow the oscillators and amplifiers in their transmission circuits to settle before the start of modulation (i.e. before commencing transmission of the packet preamble). This can be from 15-50 uS in duration. In Bluetooth the start time of the packet (which occurs after the unmodulated carrier) is fixed and stable relative to the length of the carrier since this is defined by the Bluetooth standard. The receiving device therefore knows in advance when the period of unmodulated carrier will terminate and the packet begin, i.e. when it should stop sampling the received signal for antenna selection purposes and start listening to the transmission. It is feasible for the receiving device to sample the unmodulated carrier twice in the time available. The receiving device can then make a decision about which antenna to use based on the received signal strength or some other criterion.

2) Not all Bluetooth devices transmit a period of unmodulated carrier before the start of a packet. Other Bluetooth devices may transmit an unmodulated carrier but for too short a time to allow for the signal to be sampled by two or more antennas before the start of the packet. Therefore, in another embodiment the receiving device may start listening to the transmission at the start of the packet and subsequently perform the antenna selection process while the packet is actually being received. So that no data is lost, the receiving device preferably performs the antenna selection operation during a part of the packet that it does not need to listen to because it has already predicted what data that part of the packet will contain. For example, the Bluetooth header is ⅓ FEC encoded so each bit is repeated 3 times, sequentially. The header occurs at the start of the packet, before the payload. Therefore, once the sequence of header bits has been received the receiving device may perform antenna selection during repetition of those bits. In addition, for packets carrying voice traffic (for example Bluetooth eSCO packets) several of the bits in the header have known, predictable values. This means that actually receiving some portions of the packet header is not necessary; once the packet type is known, the contents of portions of the header can be determined post-reception. It is therefore possible to take the receive chain off-line during these times in order to perform sampling of the alternative antenna or antennas. If the signal level (or other chosen measure) is determined to be better on an alternative antenna, a switch can be performed before the unique data portion of the packet begins.

Both of the techniques described above are advantageous because they reduce the latency between antenna choice and data reception to tens of microseconds rather than hundreds of milliseconds. These techniques are therefore very applicable to mobile devices used in dynamic environments. These techniques are also applicable to devices with a single receive chain.

The techniques described above are also of benefit when it comes to transmitting packets since typically a device will use the same antenna array for transmission as it used for reception. These techniques are therefore also of benefit to devices that do not have the benefits of antenna diversity. For example, in a master/slave radio system such as Bluetooth it is typical for a master to poll a slave and for the slave to respond near-immediately if required to do so. The radio communication paths are largely bidirectional, so in the event that we have two devices—a master without antenna diversity talking to a slave with antenna diversity—then by choosing the optimum antenna to listen to the master, the slave has almost certainly chosen the optimum antenna for sending the subsequent reply packet.

Although both the techniques described above are advantageous, in practice technique 1 may be preferable to technique 2. Technique 2 may be superficially more attractive because it does not rely on an unmodulated carrier. However, technique 2 does rely on enough of the header being received using whichever antenna is currently selected to be recognised as an eSCO or other packet to trigger the antenna selection process. The header is ⅓ FEC encoded to make it more robust. However, in the event of a very deep fade then the header may not be received at all and the packet will be lost.

The two techniques described above will now be described in more detail.

FIG. 2 shows a process of selecting an antenna according to technique 1. First, the receiving device starts to receive an unmodulated carrier before the packet is due to commence in accordance with the Bluetooth protocol (step 200). The antenna selection unit determines whether there is sufficient time to perform an antenna selection before the packet itself is due to start (step 202). If there is not sufficient time, the antenna selection unit may shut-down the selection process in order to save power (step 204). The receiving device may then signal to the transmitting device that an extended period of unmodulated carrier should be transmitted in future (step 206).

If the device determines that the unmodulated carrier being received is of sufficient length, it connects first one antenna (step 208) and then the other antenna (step 210) to the receive chain and assesses the quality of the signals received by means of each antenna by sampling the received signals. The antenna that is judged to be receiving the better quality signal is connected to the receive chain for the commencement of the packet (step 212).

Not all devices transmit a period of unmodulated carrier before the start of a packet. A communication protocol may therefore be designed or implied such that if a transmitting device knows that a peer device implements an antenna switching technique based on an unmodulated carrier, then that transmitting device transmits an extended period of unmodulated carrier in order to facilitate the antenna selection process. This protocol may be based on explicit information being transmitted from one device to another, e.g. a device signalling that it supports antenna selection during connection set-up or at a later time, when it determines that the other device is not transmitting a sufficient period of unmodulated carrier.

Another option is to implement an implied protocol, in which a device determines using data intended for a different purpose that a peer device supports an antenna selection process using an unmodulated carrier. For example, in some radio protocols devices typically exchange manufacturer IDs and versions or model numbers during connection setup. The receiving device may be arranged to determine from this information that the peer device is a type of device that supports the antenna selection process and consequently transmit an extended period of unmodulated carrier prior to sending future packets to that device. In other words, there is no actual protocol but the device will vary its transmitted unmodulated carrier based on what it knows about the capabilities of the peer device. The devices are therefore "signalling" in the broadest sense.

The receiving device may include a database or lookup table that it uses to determine whether a particular make or model of peer device performs the antenna selection process. This information may be programmed into the device when it is manufactured. The device may also access this information from external sources e.g. over an internet connection. The device may access the necessary information over a network each time that it initiates communication with a peer device. The device may store the accessed information in its memory so that it can be retrieved the next time that the device encounters a peer device of the same type. The receiving device may download regular updates of peer configuration information over a network or such information might be broadcast to all devices by a network in which those devices are operating.

An example of an implied protocol is shown in FIG. 3. The communication device receives data during connection set-up that includes information identifying the type of the other device, e.g. its manufacturer and model number (step 300). The device uses this information to determine whether or not the other device supports antenna selection using an unmodulated carrier (step 302). So as to avoid transmitting unmodulated carrier unnecessarily, the device determines whether the packet will contain synchronous data, e.g. voice data (step 304). If the communication does involve synchronous data, the device first transmits an extended period of unmodulated carrier (step 306). Packet loss is less serious for communications involving asynchronous data, and therefore if the device determines that the packet will not contain synchronous data, it may not transmit an extended period of unmodulated carrier (step 308).

The steps of determining whether or not to transmit an extended period of unmodulated carrier may suitably be performed by a processor operating under software control.

Extending the period of unmodulated carrier normally transmitted by the device may mean simply lengthening the time for which the carrier is transmitted in devices that would normally transmit an unmodulated carrier before a packet or it may mean transmitting an unmodulated carrier when it would not normally have been transmitted for devices that would normally commence transmission with the packet preamble.

Using an unmodulated carrier to perform the antenna selection process may be advantageous because it is a signal that is already transmitted by many devices and so it allows the receiving device to select the appropriate antenna without having to demand transmission specifically for that purpose from the transmitting device. However, it should be understood that the unmodulated carrier is merely an advantageous example of a signal that may be used for antenna selection. In practice, any suitable signal may be used. Therefore, the receiving device, rather than request that the transmitting device transmit an extended period of unmodulated carrier, might request the transmitting device to transmit some other kind of signal suitable for performing an antenna selection process.

Suitably the signal used for the antenna selection process is transmitted by the device from which the receiving device is anticipating receiving a transmission as this enables the receiving device to select the optimum antenna for the particular signal path that exists between the receiving and transmitting devices.

Preferably there should be either no delay or a minimal delay between the termination of the transmission that the receiving device uses for selecting an antenna and the start of the transmission that the selected antenna will be used to receive. Any substantial delay may mean that the selected antenna is no longer the best antenna for the purpose due to changes in the transmission path during the intervening period, e.g. changes resulting from the user moving around. Therefore, the antenna selection process is preferably performed immediately before the packet is transmitted so that the antenna selected immediately before the packet can with reasonable certainty be expected to be the best antenna for receiving the packet. For example, in devices that transmit an unmodulated carrier before starting to transmit a packet, the delay between the end of the unmodulated transmission and the packet is essentially zero since, depending on the modulation scheme in use, modulation typically starts as soon as the observed carrier starts to move in the correct frequency and/or phase.

Any delay between the selection of the antenna and the start of the transmission to be received using that antenna is preferably short enough that the radio environment is substantially unchanged between the selection of the antenna and the end of the transmission. This may be achieved by performing antenna selection sufficiently quickly that the receiving device is likely to be in substantially the same location at the end of the transmission as it was when the antenna was selected. This is because, if the location of the device is substantially unchanged, the antenna that receives the best quality signal at the end of the transmission will usually be the antenna that was receiving the best quality signal when the antenna selection process was performed. As an example, the user of a receiving device walking briskly may be moving at 2 metres per second. The length of a typical Bluetooth packet is around 400 μs. Assuming that there is no delay between the end of the antenna selection process and the start of the Bluetooth packet, the receiving device will have moved slightly under 1 mm between the time the antenna was selected and the end of the Bluetooth packet. The signal wavelength at 2.4 GHz (the ISM band) is just over 12 cm. Any change in the radio environment is negligible over 1 mm when compared with the 12 cm wavelength. Therefore, the radio environment will appear fairly static to the receiving device for the duration of a Bluetooth packet. This can be confirmed in practice by measuring the "length" of a real-life fade using an antenna linked to a spectrum analyser. Using this technique it has been identified that a typical fade has a length of between 1 cm and 2.5 cm. To be successful an antenna selection algorithm needs to be able to select and choose the correct antenna while the device is located within the fade. The "movement window" of around 1 mm calculated above is well within the 1 to 2.5 cm fade.

This can be contrasted with traditional post-hoc antenna selection algorithms where the antenna selection procedure can take around 300 ms in total. In this time, the user may have moved around 60 cm, which is several times the signal wavelength. The fading conditions are therefore likely to be completely different when the selected antenna is used from when it was selected.

FIG. 4 shows a process of selecting an antenna according to technique 2. Technique 2 involves switching between antennas during receipt of the packet itself. The packet is initially received by a first one of the two antennas (step 400). The device decodes the packet as it is received to obtain the data contained therein (step 402). From the decoded data it is able to predict the data that will be contained in a later part of the packet (step 404). When that later part of the packet is due to be received, the device is arranged to switch the receive chain to the other antenna so that the quality of the signal being received by the other antenna can be assessed (step 406). The antenna receiving the better quality signal is then connected to the receive chain for receiving the remainder of the packet (step 408). After receiving the complete packet, the device performs post-reception processing to replace the missing part of the packet with the predicted data (step 410).

The receiving device may be arranged to predict what data will be contained in parts of the packet yet to be received by the device based on its advance knowledge of what certain parts of the packet are mandated to contain in accordance with a communication protocol such as the Bluetooth specification. For example, the device may be able to predict data that will be contained in subsequent fields of the packet after decoding the field indicating the packet type. Alternatively, the device may know that some of the data will be a repeat of data that it has already received.

The antenna selection unit shown in FIG. 1 may be arranged to receive data from the decoder that enables it to predict what data will be contained in a section of the packet that is yet to be received. Alternatively, the prediction may be performed by a separate processor that receives data from the decoder and signals the antenna selection unit to perform the appropriate switching and assessment operations for determining the better antenna for receiving the remainder of the packet.

The embodiments above have been described mainly with reference to a communication device having two antennas. However, it should be understood that the principles described herein are applicable to devices having more than two antennas, although the timings become more difficult to accommodate the more antennas that have to be assessed during the available time period.

RSSI is not the only measure that is available for measuring the quality of a received signal. The techniques above may equally be implemented using other measures of signal quality, such as signal-to-noise ratio, bit error rate etc.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The invention claimed is:

1. A communication device arranged to operate in accordance with a communication protocol in which a transmitting device is scheduled to commence a transmission at a time known in advance to a receiving device, the communication device comprising at least two antennas and being arranged to select one of those antennas to receive a transmission from a transmitting device by, immediately before the transmitting device is scheduled to commence its transmission: assessing a quality of a signal received by means of a first one of the antennas; assessing a quality of a signal received by means of a second one of the antennas; and determining, based on the assessed quality of the signals received by means of the first and second antennas, the antenna to be used for receiving the transmission from the transmitting device,
wherein the communication device is arranged to:
assess the quality of the signals received by the first and second antennas by assessing the quality of an unmodulated carrier received from the transmitting device before the transmitting device is scheduled to commence its transmission, and
if it determines that the transmitting device is not transmitting an unmodulated carrier for sufficient time to enable the communication device to select which of the at least two antennas should be used to receive a transmission from that device, transmit to the transmitting device a request for it to transmit an unmodulated carrier for an extended period of time.

2. A communication device as claimed in claim 1, wherein the communication device comprises a receive chain switchable between the first and second antennas, the communication device being arranged to:
when assessing the quality of the signal received by means of the first antenna, connect the first antenna to the receive chain;
when assessing the quality of the signal received by means of the second antenna, connect the second antenna to the receive chain; and
when the transmitting device is scheduled to commence its transmission, connect the antenna to be used for receiving that transmission to the receive chain.

3. A communication device as claimed in claim 1, wherein the communication device is arranged to assess the quality of the signals received by means of the first and second antennas by measuring a signal strength of the respective signals received by the first and second antennas.

4. A communication device as claimed in claim 1, wherein the communication device is arranged to determine that another device is capable of performing an antenna selection operation prior to a time at which a transmitting device is scheduled to commence a transmission in accordance with the protocol, and to, responsive to that determination, commence transmitting to the other device before the communication device was scheduled to commence transmitting in accordance with the protocol.

5. A communication device comprising a receive chain switchable between at least two antennas, the communication device being arranged to:
connect a first one of the antennas to the receive chain and start receiving a transmission by means of that antenna;
determine that a part of the transmission yet to be received by the communication device will repeat bits already received by the first one of the antennas and demodulated by the communication device; and
perform antenna selection during receipt of the repeated bits by:
after demodulation of the bits, switching the receive chain from being connected to the first one of the antennas to being connected to another one of the antennas;

assessing a quality of the signal received by the other one of the antennas during receipt of the repeated bits; and
determining, based on the assessed quality of the signal received by the other one of the antennas during the receipt of the repeated bits, which of the at least two antennas to connect to the receive chain for receiving a subsequent, unique part of the transmission.

6. A communication device as claimed in claim 5, wherein the communication device is arranged to assess the quality of the other one of the antennas during a part of the transmission that is representative of a packet header.

7. A communication device as claimed in claim 6, wherein the communication device is arranged to connect the antenna to be used for receiving the subsequent, unique part of the transmission to the receive chain prior to the communication device receiving a part of the transmission that is representative of a packet payload.

8. A communication device as claimed in claim 5, wherein the communication device is arranged to operate in accordance with a protocol that specifies at least part of the data to be included in a transmission, the communication device being arranged to predict, based on the data represented by a part of the transmission already received by the communication device, data that will in accordance with the protocol be represented by a part of the transmission yet to be received by the communication device.

9. A communication device as claimed in claim 8, wherein the communication device is arranged to predict data to be represented by a part of the transmission yet to be received by the device by determining that a part of the transmission yet to be received will represent data already received by the communication device.

10. A communication device as claimed in claim 8, wherein the communication device is arranged to predict data to be represented by a part of the transmission yet to be received by the device in dependence on a packet type associated with the transmission.

11. A communication device as claimed in claim 8, wherein the communication device is arranged to transmit a response to the transmission by means of the same antenna that is selected to receive the transmission.

12. A communication device arranged to operate in accordance with a communication protocol in which a transmitting device is scheduled to commence a transmission at a time known in advance to a receiving device,
the communication device being arranged to determine that another device is capable of performing an antenna selection operation prior to a time at which a transmitting device is scheduled to commence a transmission, and to, responsive to that determination,
commence transmitting an unmodulated carrier to the other device before the communication device is scheduled to commence its transmission in accordance with the protocol,
and to extend the period of time of transmission of the unmodulated carrier based on a request by the receiving device if the receiving device determines that the unmodulated transmission time is insufficient to enable the receiving device to perform antenna selection.

13. A communication device as claimed in claim 12, wherein the communication device is arranged to determine from a transmission received according to the protocol that the other device is capable of performing the antenna selection operation.

14. A communication device as claimed in claim 12, wherein the communication device is arranged to determine that the other device is capable of performing the antenna selection operation in dependence on a section of the transmission that is designated by the protocol for a purpose other than indicating that the transmitting device is capable of performing an antenna selection operation.

15. A communication device as claimed in claim 14, wherein the communication device is arranged to determine that the other device is capable of performing the antenna selection operation in dependence on a section of the transmission that is designated by the protocol to indicate an identifier associated with the transmitting device.

16. A communication device as claimed in claim 14, wherein the communication device is arranged to determine that the other device is capable of performing the antenna selection operation in dependence on a section of the transmission that is designated by the protocol to indicate a manufacturer of the transmitting device.

17. A communication device as claimed in claim 14, wherein the communication device is arranged to determine that the other device is capable of performing the antenna selection operation in dependence on a section of the transmission that is designated by the protocol to indicate a type of the transmitting device.

18. A method for selecting an antenna for receiving a transmission made in accordance with a protocol in which a receiving device knows in advance when a transmitting device is scheduled to commence a transmission, the receiving device comprising a receive chain switchable between at least two antennas, the method comprising:
the transmitting device transmitting an unmodulated carrier signal to the receiving device before it is due to commence its transmission of any preambles in accordance with the protocol;
the receiving device connecting a first one of its at least two antennas to the receive chain for receiving said unmodulated carrier signal and assessing a quality of the unmodulated carrier signal received by means of the first antenna and then connecting a second one of its at least two antennas to the receive chain and assessing a quality of the unmodulated carrier signal received by means of the second antenna;
the receiving device, when the transmitting device is scheduled to commence its transmission, and before any preambles are received in accordance with the communication protocol, connecting one of its at least two antennas to the receive chain in dependence on the assessed quality of the signals received by the first and second antennas; and
the receiving device, if it determines that the transmitting device is not transmitting the unmodulated carrier signal for sufficient time to enable the receiving device to select which of the at least two antennas should be used to receive the transmission from that device, transmitting to the transmitting device a request for it to transmit an unmodulated carrier for an extended period of time.

* * * * *